United States Patent
Doerr et al.

(10) Patent No.: US 8,589,017 B2
(45) Date of Patent: Nov. 19, 2013

(54) CALIBRATING AN INTERNAL COMBUSTION ENGINE

(75) Inventors: Bernd Doerr, Wallduern (DE); Roland Schleser, Loewenstein (DE); Holger Niemann, Shanghai (CN); Daniel Damm, Ludwigsburg (DE); Andreas Heyl, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 461 days.

(21) Appl. No.: 12/736,184

(22) PCT Filed: Nov. 25, 2008

(86) PCT No.: PCT/EP2008/066147
§ 371 (c)(1),
(2), (4) Date: Dec. 28, 2010

(87) PCT Pub. No.: WO2009/118065
PCT Pub. Date: Oct. 1, 2009

(65) Prior Publication Data
US 2011/0093145 A1   Apr. 21, 2011

(30) Foreign Application Priority Data
Mar. 28, 2008 (DE) .......................... 10 2008 000 869

(51) Int. Cl.
*G01M 17/00* (2006.01)

(52) U.S. Cl.
USPC ............................................ 701/29.1; 701/22

(58) Field of Classification Search
USPC .................................. 701/22, 29.1–29.2, 33.1
See application file for complete search history.

(56) References Cited

U.S. PATENT DOCUMENTS

| | | | |
|---|---|---|---|
| 2002/0052677 A1 | 5/2002 | Lasson et al. | |
| 2008/0210509 A1 | 9/2008 | Fenkart et al. | |
| 2008/0264398 A1* | 10/2008 | Schondorf et al. | 123/674 |
| 2009/0140521 A1* | 6/2009 | Bryan et al. | 290/31 |
| 2009/0204280 A1* | 8/2009 | Simon et al. | 701/22 |
| 2009/0221390 A1* | 9/2009 | Houle | 475/5 |

FOREIGN PATENT DOCUMENTS

| | | |
|---|---|---|
| DE | 10 2005 055 001 | 5/2007 |
| GB | 2 358 845 | 8/2001 |

* cited by examiner

*Primary Examiner* — Hussein A. Elchanti
(74) *Attorney, Agent, or Firm* — Kenyon & Kenyon LLP

(57) ABSTRACT

In a method for determining the torque of an internal combustion engine of a motor-vehicle hybrid drive device which further includes a secondary electric motor coupled to the internal combustion engine, the torque of the internal combustion engine is determined at at least one operating point by comparison to the known torque of the secondary motor.

11 Claims, 1 Drawing Sheet

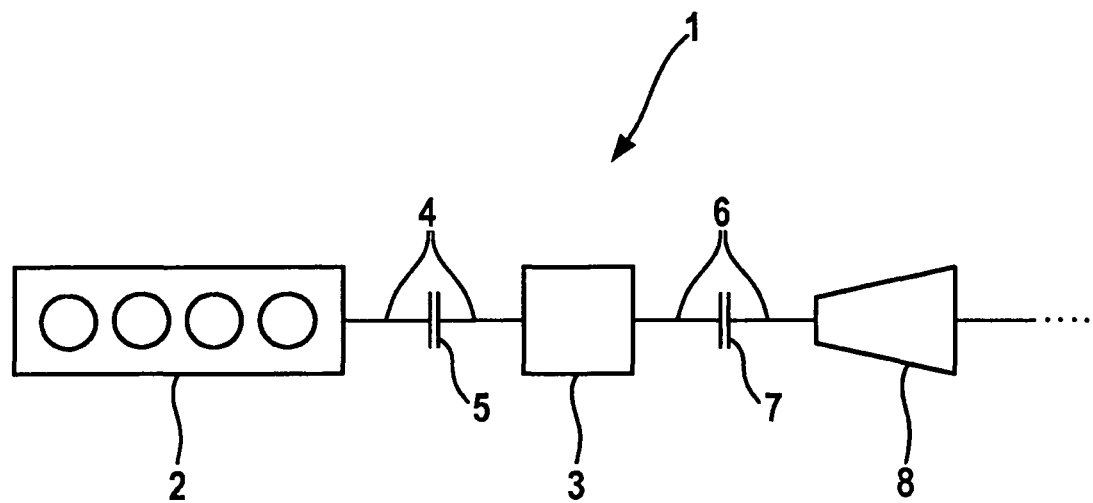

CALIBRATING AN INTERNAL COMBUSTION ENGINE

BACKGROUND OF THE INVENTION

1. Field of the Invention

The present invention relates to a method for determining the torque of an internal combustion engine for a motor vehicle, particularly the internal combustion engine of a motor-vehicle hybrid drive device, with the aid of at least one secondary motor, especially an electric motor, coupled to the internal combustion engine.

2. Description of Related Art

Determining the instantaneous torque of the internal combustion engine is particularly important for motor vehicles having an electronic engine management, since this value is a control variable of the internal combustion engine, and therefore has a strong influence on the performance of the motor vehicle.

Under the state of the art, the torque maps of a small number of internal combustion engines are measured during the development of a motor vehicle. The map of all internal combustion engines of an entire production run is inferred based on this data. However, due to manufacturing tolerances during the production of the internal combustion engines, deviations frequently occur between the actual, instantaneous torque present and the torque predefined by the control circuit of the internal combustion engine. These deviations have a negative effect on the performance of the motor vehicle. If, in addition to the internal combustion engine, a further secondary motor, particularly an electric motor in a motor-vehicle hybrid drive device, is provided in the drive system of the motor vehicle and coupled to the internal combustion engine, then the torque maps for the internal combustion engine and the secondary motor are recorded separately from each other, any existing errors in the torque map, particularly the torque map of the internal combustion engine, thereby adding up. In principle, however, the instantaneous torque of an electric motor may be determined from existing characteristic quantities, particularly speed and flowing current, with markedly greater accuracy than for an internal combustion engine.

BRIEF SUMMARY OF THE INVENTION

Therefore, an object of the present invention is to provide a method for determining the torque of an internal combustion engine, particularly the internal combustion engine of a motor-vehicle hybrid drive device, which allows a considerably more precise determination of the instantaneous torque compared to the related art.

To that end, a method is provided in which the internal combustion engine is coupled to at least one secondary motor, particularly an electric motor or pneumatic engine, and the instantaneous torque of the internal combustion engine is determined at least one operating point by comparison to the known torque of the secondary motor. In so doing, it is assumed that the torque of the secondary motor is known. This is especially justified for an electric motor, since the instantaneous torque may be determined for it from characteristic quantities easy to be picked off, such as flowing current and speed. Since according to the description, the instantaneous torque of the secondary motor, particularly the electric motor, is therefore known, a comparison between the internal combustion engine and the secondary motor brings about a substantial improvement in the determination of the instantaneous torque. In addition to the increased accuracy in determining the absolute, instantaneous torque of the internal combustion engine, the relative deviation in the torque determination between the internal combustion engine and the secondary motor is reduced by the procedure described, as well.

According to a further refinement of the present invention, the internal combustion engine is coupled to the secondary motor via an interrupting clutch, particularly an electrical release clutch. This allows movement of the motor vehicle even at low speeds of the drive device, at which the secondary motor usually has a higher torque than an internal combustion engine. At higher speeds, especially in higher load ranges, the interrupting clutch between the internal combustion engine and the secondary motor is closed, thereby permitting a combined operation. The interrupting clutch must also be in the closed state in order to determine the torque according to the preceding explanations.

In an advantageous development of the present invention, the internal combustion engine and the secondary motor are decoupled from a drive train of the motor vehicle while the torque is being determined. This decoupling makes it possible to determine the torque of the internal combustion engine without external influences, particularly to rule out loads owing to operation of the motor vehicle. If the drive device having the internal combustion engine and secondary motor is not decoupled from the drive train of the motor vehicle, then the power drawn off outwards which is necessary for the operation, particularly the normal driving, must be determined while determining the torque. However, this cannot always be accomplished with sufficient accuracy, resulting in turn in errors in determining the torque of the internal combustion engine.

In a further refinement of the present invention, the secondary motor generates a torque which is opposed to that of the internal combustion engine. In most cases, the internal combustion engine is used here as driving motor, a specific operating point, particularly a specific speed, is set, and the secondary motor is used as braking motor. From data able to be picked off at the secondary motor—speed and flowing current in the case of an electric motor—the torque presently available may now be determined easily from the map of the secondary motor. Thus, the torque presently generated by the internal combustion engine is also known from the direct coupling between the internal combustion engine and the secondary motor.

A further development of the method according to the present invention provides for determining the torque within a speed range. In this instance, various operating points, especially speeds, are set, and the instantaneous torque of the internal combustion engine is determined according to the previous explanations. If the torque is determined with a sufficient number of measuring points within a sufficiently large speed range, a map of the internal combustion engine is obtained.

According to a further refinement of the present invention, the speed range is traversed automatically with the aid of a control-engineering device. Due to the automation of the torque-measuring method, a large number of operating points may be approached in a shorter time than is possible manually. In particular, a complete internal-combustion-engine map may be created in a short time without interventions from outside.

In another advantageous development of the present invention, the data regarding the torque determination is stored in a memory. Accordingly, a complete internal-combustion-engine map may be created sequentially, which means various operating points are reached at various moments, particularly moments extending over a broader period of time. Consequently, the map of the internal combustion engine is supplemented step-by-step with advancing time. Moreover, the data already in the memory may be utilized for comparison, especially for checking the plausibility of the presently determined torque.

According to a further refinement of the present invention, the data is used to update basic engine data stored in an engine-management device. For example, the basic engine data may be provided according to the related art, thus, by performing measurements on a small number of internal combustion engines, and stored in the engine-management device. Because the basic engine data contained in the engine-management device is updated according to the present invention based on instantaneous torque measurements, e.g., by determining the torque within a speed range or the sequential setting of individual internal-combustion-engine operating points according to the previous explanations, therefore, of all the basic engine data provided in the as-delivered condition, that engine data which is necessary for the engine management is adjusted to the internal combustion engine actually at hand. By adapting the stored engine data to the internal combustion engine actually at hand, the engine-management device may consequently be adjusted better to the existing driving situation, thereby improving the performance of the vehicle.

According to one advantageous development of the present invention, influencing of the internal combustion engine, particularly by disturbances, is detected by determining the torque. This detection of influences is accomplished by comparing the instantaneously measured torque to the data stored in the memory, i.e., in the engine-management device, especially data already updated on the basis of earlier measurements. If the instantaneously determined torque data does not lie within a certain tolerance range with respect to the stored data, it may be assumed that an influence, especially a disturbance, of the internal combustion engine exists. In this manner, damage especially to the internal combustion engine may be recognized early on, so that measures may be taken in timely fashion before further damage occurs.

According to a further refinement of the present invention, the torque of the internal combustion engine is determined in the stationary state, particularly on a test stand, and/or during operation of the motor vehicle. When determining the torque in the stationary state, e.g., as a calibration step of the internal combustion engine before installation in a motor vehicle, prior to delivery of the motor vehicle or within the course of maintenance of the motor vehicle, advantageously the torque is determined within a speed range, especially with the aid of a control-engineering device according to the previous explanations. In this manner, the engine data may be adapted to the actual behavior of the internal combustion engine. The torque may also be determined during operation of the motor vehicle. In order to keep the actual operation free of interruption, it is possible to use standstill times of the motor vehicle to set individual operating points, and to perform a torque measurement.

The present invention also relates to a hybrid drive device, especially of a motor vehicle, that has at least two different power units, in particular an electric motor and an internal combustion engine, having a device for determining the torque of the internal combustion engine according to the method as set forth in the previous explanations.

BRIEF DESCRIPTION OF THE DRAWING

FIG. 1 shows a schematic representation of an exemplary embodiment of the present invention.

DETAILED DESCRIPTION OF THE INVENTION

The FIGURE shows a hybrid drive device 1 for a motor vehicle (not shown). Hybrid drive device 1 has an internal combustion engine 2 and an electric motor 3 which are coupled to each other via a torque-transmission device 4 and an interrupting clutch 5. The further systems of the motor vehicle, particularly the drive system, are connected to electric motor 3 via a further torque-transmission device 6, a further interrupting clutch 7 as well as a gear unit 8. This design permits a complete separation of hybrid drive device 1 from the further systems of the motor vehicle, and therefore, with interrupting clutch 7 open, an uninfluenced determination of the torque of internal combustion engine 2 with the aid of electric motor 3. In the same way, with interrupting clutch 5 open and interrupting clutch 7 closed, a vehicle operation powered exclusively by the electric motor is possible; if both interrupting clutches 5 and 7 are closed, the motor vehicle is powered both by internal combustion engine 2 and by electric motor 3.

The instantaneous torque is measured as described below. First of all, interrupting clutch 7 is opened, so that the hybrid drive device is decoupled completely from the further systems of the motor vehicle. Furthermore, a connection is produced between internal combustion engine 2 and secondary motor 3 via torque-transmission device 4 by closing interrupting clutch 5. Following that, internal combustion engine 2 is set to an operating point, particularly a speed, by an engine-management device (not shown). At the same time, secondary motor 3 is used as braking motor, and the operating parameters of secondary motor 2, e.g., speed and flowing current in the case of an electric motor, are read out. As a result, the instantaneous torque of internal combustion engine 2 may be determined from this data. In another exemplary embodiment, a plurality of operating points are approached one after another over time by an engine-management device (not shown), the torque prevailing in each instance is determined and is stored in the engine-management device or in a memory (likewise not shown).

What is claimed is:

1. A method for determining a torque of an internal combustion engine of a hybrid drive of a motor vehicle, comprising:
   coupling the internal combustion engine to a secondary motor, wherein the secondary motor is an electric motor;
   identifying a value of an operating parameter of the electric motor while coupled to the engine and decoupled from a drivetrain of the motor vehicle;
   determining the torque of the internal combustion engine at a selected operating point from the identified operating parameter value;
   providing a value of the determined torque as an input to an engine management module managing the hybrid drive; and
   detecting damage to the internal combustion engine on the basis of the value of the determined torque.

2. The method as recited in claim 1, wherein the internal combustion engine is coupled to the secondary motor by an interrupting clutch, wherein the interrupting clutch is an electrical release clutch.

3. The method as recited in claim 2, wherein the internal combustion engine and the secondary motor are decoupled from a drive train of the motor vehicle during the determining of the torque of the internal combustion engine.

4. The method as recited in claim 3, wherein the secondary motor generates a torque opposed to the torque of the internal combustion engine.

5. The method as recited in claim 3, wherein the torque of the internal combustion engine is determined within a specified speed range.

6. The method as recited in claim 5, wherein the speed range is traversed automatically with the aid of a control device.

7. The method as recited in claim 5, wherein the determined torque data is stored in a memory.

8. The method as recited in claim 7, wherein the determined torque data is used to update basic engine data stored in an engine-management device.

9. The method as recited in claim 5, wherein influencing of the internal combustion engine by disturbances is detected by determining the torque.

10. The method as recited in claim 5, wherein the torque of the internal combustion engine is determined at least one of: (a) in a stationary state on a test stand; and (b) during operation of the motor vehicle.

11. A hybrid drive system of a motor vehicle, comprising:
an internal combustion engine;
a secondary motor configured as an electric motor;
an interrupting clutch coupling the internal combustion engine to the secondary motor, wherein the interrupting clutch is an electrical release clutch; and
a device configured to identify a value of an operating parameter of the electric motor while coupled to the engine and decoupled from a drivetrain of the motor vehicle and determine the torque of the internal combustion engine at a selected operating point from the identified operating parameter value, wherein damage to the internal combustion engine is detected on the basis of the determined torque.

* * * * *

UNITED STATES PATENT AND TRADEMARK OFFICE
CERTIFICATE OF CORRECTION

PATENT NO.       : 8,589,017 B2                                               Page 1 of 1
APPLICATION NO. : 12/736184
DATED            : November 19, 2013
INVENTOR(S)      : Doerr et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 553 days.

Signed and Sealed this
Twenty-second Day of September, 2015

Michelle K. Lee
*Director of the United States Patent and Trademark Office*